Figure 1:
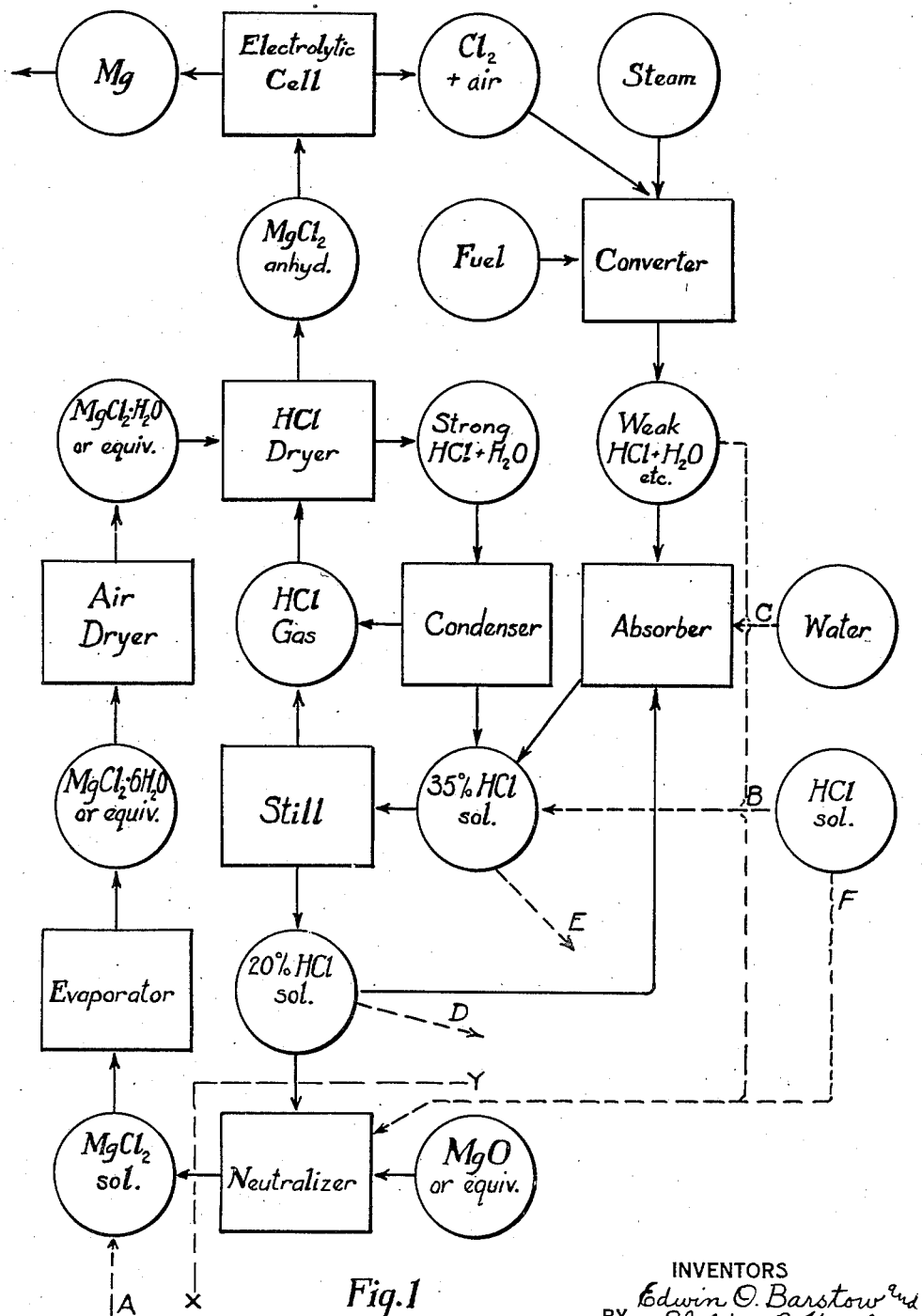

April 14, 1931.   E. O. BARSTOW ET AL   1,800,589
CYCLIC PROCESS FOR PRODUCING MAGNESIUM
Filed Dec. 19, 1929   3 Sheets-Sheet 1

INVENTORS
Edwin O. Barstow and
BY  Sheldon B. Heath
Thomas Griswold, Jr.
ATTORNEY April 14, 1931. E. O. BARSTOW ET AL 1,800,589
CYCLIC PROCESS FOR PRODUCING MAGNESIUM
Filed Dec. 19, 1929  3 Sheets-Sheet 2

INVENTORS
Edwin O. Barstow
BY Sheldon B. Heath
Thomas Griswold Jr.
ATTORNEY

April 14, 1931. E. O. BARSTOW ET AL 1,800,589
CYCLIC PROCESS FOR PRODUCING MAGNESIUM
Filed Dec. 19, 1929 3 Sheets-Sheet 3

INVENTORS
Edwin O. Barstow and
Sheldon B. Heath
BY Thomas Griswold, Jr.
ATTORNEY Patented Apr. 14, 1931

1,800,589

UNITED STATES PATENT OFFICE

EDWIN O. BARSTOW AND SHELDON B. HEATH, OF MIDLAND, MICHIGAN, ASSIGNORS TO THE DOW CHEMICAL COMPANY, OF MIDLAND, MICHIGAN, A CORPORATION OF MICHIGAN

CYCLIC PROCESS FOR PRODUCING MAGNESIUM

Application filed December 19, 1929. Serial No. 415,197.

The present invention has regard to a cyclic process for the manufacture of magnesium wherein a fused bath containing magnesium chloride is electrolyzed to produce magnesium and chlorine, and the latter is then employed to make a further amount of magnesium chloride by reaction with a suitable magnesium base, such magnesium chloride being returned to the process as the raw material for the electrolysis.

We are aware that it has already been proposed to utilize the chlorine produced by the electrolysis in a continuous cycle for reconversion to magnesium chloride which in turn serves as the raw material to be fed to the electrolytic cell, as, for example, in U. S. Patent 1,359,654 to Ashcroft. Under usual conditions such magnesium chloride is formed in aqueous solution, thus necessitating the collateral steps of evaporation to produce the solid hexahydrated chloride, or similar hydrated salt containing from four to six molecules of water of crystallization, and subsequent drying and dehydrating thereof to produce a substantially anhydrous chloride suitable for feeding to the cell. While the first stages of drying of the hydrated magnesium chloride may be carried out in air without much if any decomposition of the salt, the final stage has been found to require an atmosphere of hydrochloric acid in order to prevent extensive decomposition thereof. In all previous processes of the present general character of which we have knowledge, the possibility has been overlooked of first converting the chlorine derived from the electrolysis, at least in part, to substantially dry hydrochloric acid, to be used in the final dehydrating of magnesium chloride and subsequently employing the hydrous acid resulting from the drying operation for reacting upon a magnesium base, e. g. magnesium oxide, hydroxide, carbonate or the equivalent, to form additional magnesium chloride which is then similarly dehydrated and utilized for the electrolysis in a continuous cycle of operations. An object of this invention is to provide a process of the last-mentioned character whereby a twofold utilization of the hydrochloric acid intermediate product is effected and in such manner that, when once regular working has been established, the magnesium base is the sole raw material theoretically required for maintaining a continuous and uninterrupted cycle of operations. The invention, then, consists of the steps hereinafter fully described and particularly pointed out in the claims, the annexed drawing and following description setting forth but a few of the various ways in which the principle of the invention may be used.

Figure 2:
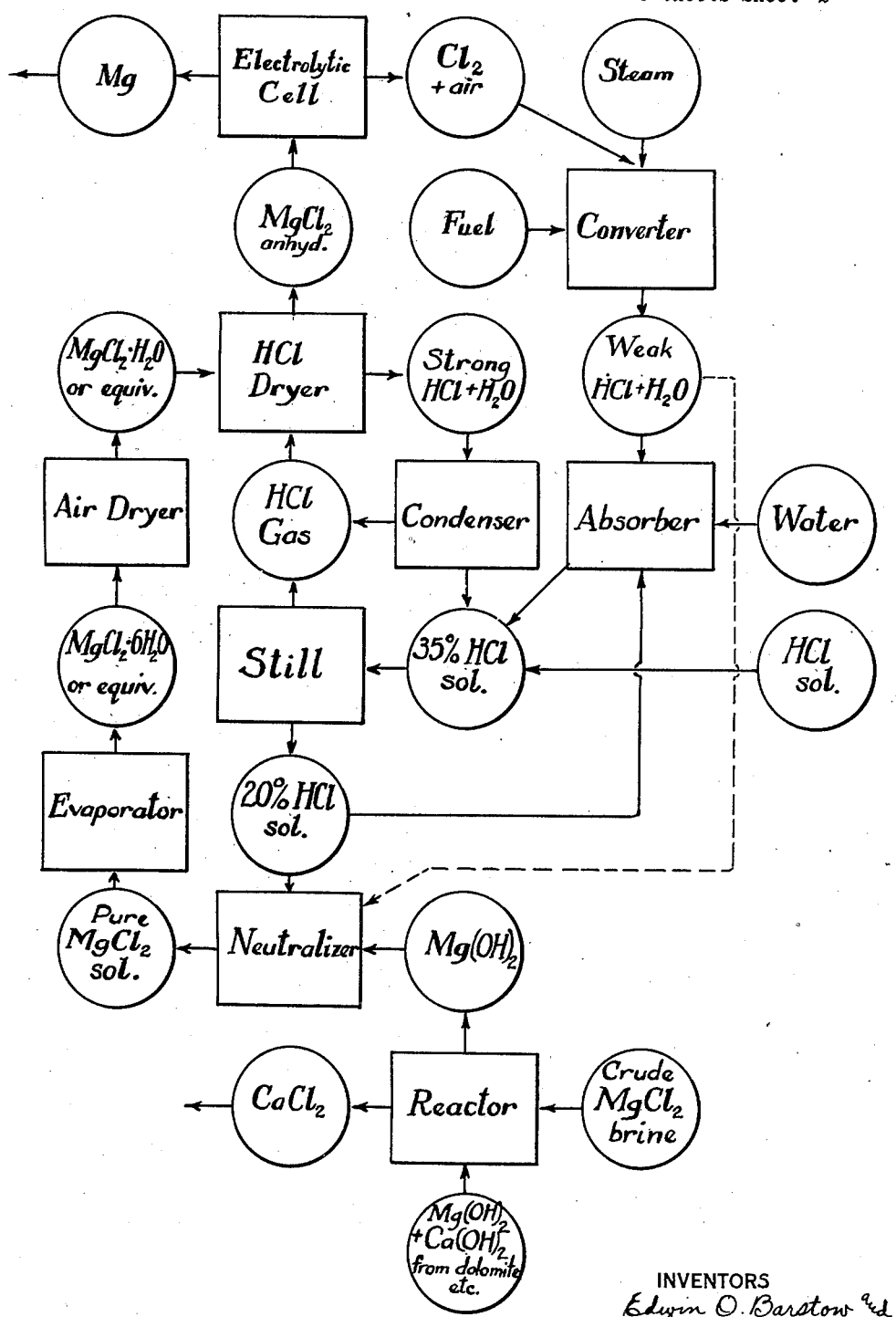
Figure 3:
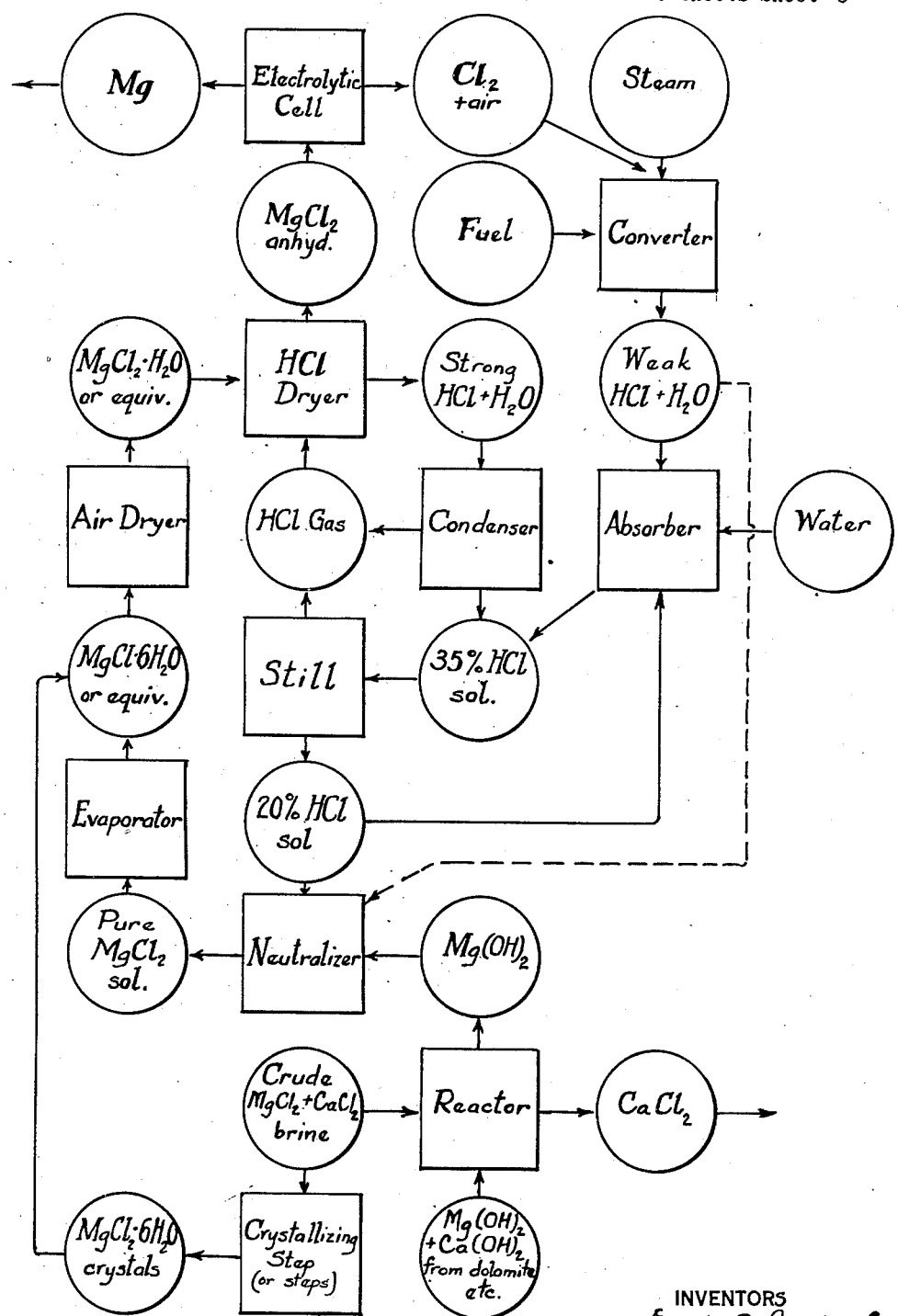

In said annexed drawing:

Fig. 1 is a flow sheet diagrammatically illustrating the sequence of related and interconnected steps in the simplest form of our improved process. Figs. 2 and 3 show more detailed procedures applicable when using crude or impure raw materials.

In practice an obstacle to the profitable utilization of the chlorine formed in the electrolysis of magnesium chloride resides in the relatively diluted condition in which it is recovered. The latter circumstance is largely due to the difficulty of handling chlorine evolved at a red heat in apparatus constructed of the usual materials, so that it has been found most convenient, if not absolutely necessary, to cool and dilute the hot chlorine by permitting the infiltration of air into the anode compartment of the cell wherein it mixed with the chlorine. The exigencies of practical operation, therefore, necessitate the disposal of large volumes of dilute chlorine which also normally contains some hydrochloric acid. We have found that such dilute chlorine may be advantageously converted to hydrochloric acid, despite the large proportion of air intermixed therewith, by burning the mixed gases with a carbonaceous fuel in the presence of water vapor in amount sufficient to combine with the chlorine according to the equation:

$$2Cl_2 + 2H_2O \rightarrow 4HCl + O_2$$

Such reaction takes place virtually quantitatively at temperatures around 1400° to 1500° C., which are maintained by the simultaneous combustion of the carbonaceous fuel, e. g. fuel oil, as is more particularly described in our prior application Serial No.

397,252, filed October 4, 1929. The exit gases from the reaction, consisting of hydrochloric acid diluted with relatively large volumes of air, water vapor and combustion gases, may be conveniently passed through one or more scrubber towers or equivalent absorption apparatus wherein the hydrochloric acid content thereof is absorbed in water or a suitable aqueous medium, preferably in a dilute hydrochloric acid solution, such as a constant boiling point solution of approximately 20 per cent. strength which may be returned from a subsequent step in the process as will be hereinafter more particularly described. In the succeeding description such acid solution of approximately 20 per cent. HCl content will be referred to simply as 20 per cent. HCl solution.

A concentrated hydrochloric acid solution, e. g. having a strength preferably of around 35 to 40 per cent. HCl, and hereinafter referred to for brevity of description as 35 per cent. HCl solution, may be obtained from the acid absorber, although less desirably a weaker acid solution than the aforesaid but having a strength in excess of that of the constant boiling point composition may be so prepared. Such strong solution is then to be distilled and fractionated in a suitable apparatus constructed of acid-resisting materials, whereby a strong, substantially dry HCl gas is prepared and separated from a residual 20 per cent. HCl solution. An advantageous method of distillation is described in a prior application of S. B. Heath, one of the inventors herein, Serial No. 397,256 filed October 4, 1929, wherein the strong acid solution is vaporized by contact with the heated vapors of an organic compound, e. g. dichlorobenzene, which is immiscible with the aqueous acid and condensable at the distillation temperature. The residual solution may be returned to the absorber to absorb fresh quantities of dilute acid gas while the strong acid gas is employed in the final drying stage for preparing anhydrous magnesium chloride which is to be fed to the electrolytic cell. The mixture of hydrochloric acid gas and water vapor obtained from the aforesaid drying step is then cooled and condensed to separate an aqueous fraction, consisting of 35 per cent. HCl solution, from the remaining strong gaseous acid, the solution being returned to the still and the strong gas being returned to the dryer.

Upon the continuance of the steps just described an excess of 20 per cent. HCl solution accumulates in the system which, assuming a quantitative conversion of the chlorine liberated in the electrolysis, would correspond to the chlorine content of the magnesium chloride electrolyzed. Such excess acid solution may be employed to react with a suitable magnesium base for preparing further quantities of magnesium chloride required for the process. As a suitable magnesium base is understood magnesium oxide, magnesium hydroxide, magnesium carbonate, or various basic compounds such as basic carbonate or basic chloride, or the so-called "end product" mixture of chloride and basic chloride or oxide produced by the exhaustive drying of hydrated magnesium chloride in air. The solution of magnesium chloride may then be evaporated in the usual way to produce a solid hydrated chloride containing from 4 to 6 molecules of water of crystallization, and the hydrated chloride so obtained further dried in air to make an air-dried product containing from 1 to 2 molecules of water of crystallization, the latter operation being practically carried out with but little decomposition of the chloride. The air-dried chloride is then finally dehydrated by drying in an HCl atmosphere according to the known method, the acid gas therefor in the present cyclic process being supplied as already explained, and the anhydrous magnesium chloride delivered to the electrolysis.

Referring to Fig. 1 of the drawing, the sequence of steps is shown diagrammatically in the order as already described, the movement of materials and intermediate products being indicated by the arrows. Starting with the electrolytic cell, the products therefrom, magnesium and chloride, are separately removed and the latter, diluted with air and hydrochloric acid, is conveyed to a converter wherein it is mixed with steam and with burning carbonaceous fuel. The combustion gases are then conducted to an absorber and the HCl content thereof extracted by absorbing in water or a dilute, e. g. 20 per cent., HCl solution to produce a 35 per cent. HCl solution. The latter is then distilled to produce a strong HCl gas substantially equivalent in amount to the acid absorbed in the absorber, leaving a residual solution of 20 per cent. HCl. The strong gas is employed to furnish the HCl atmosphere for the final dehydration of magnesium chloride and the mixture of HCl and water vapor from the dryer is then separated in a condenser into a 35 per cent. aqueous HCl solution and strong HCl gas, the solution being returned to the still, and the gas to the dryer. The residual 20 per cent. HCl solution from the still is divided into two portions, one being returned to the absorber and the other being conducted to a neutralizer wherein it is reacted with magnesium oxide or equivalent magnesium base to form a solution of magnesium chloride. Such solution is then evaporated to produce solid $MgCl_2.6H_2O$, or equivalent hydrated salt containing from 4 to 6 molecules of water of crystallization, and the hydrated salt is partially dehydrated by drying in air to form either the mono- or dihydrated chloride, or a mixture of the two. The partially dehydrated salt is finally dehydrated in an HCl atmosphere, and the anhydrous product employed for feeding to the electrolytic cell, thus completing the cycle of operations.

In case all of the hydrochloric acid produced by the conversion of the chlorine is not required for distilling to produce sufficient strong acid gas for the dehydration of magnesium chloride, and this would be true under usual operating conditions, the surplus of weak acid gas coming from the converter may be by-passed directly to the neutralizer and there absorbed by reacting with the magnesium base, as indicated by the dotted line.

To set the foregoing cyclic process in operation there is required an initial supply of magnesium chloride, which may be introduced into the system as indicated by the dotted line and arrow at A, or at any other convenient point, and of hydrochloric acid, similarly indicated at B. Additional water for absorbing the dilute HCl gas, when or if required, may be introduced into the system at C. Thereafter, by supplying an amount of magnesium base, as shown, equivalent to the magnesium chloride electrolyzed, the cycle of operations theoretically may be continuously maintained. To compensate for losses in actual practice, however, additional acid from an outside source may be introduced, as at B or F, and any required excess of magnesium base may be employed for the neutralizing step.

In the event that a supply of magnesium chloride sufficient for the demands of the process is available from another source, such as from a natural brine or as a by-product of other chemical processes, the cyclic operation of the process as herein described may be interrupted as indicated by the dotted line XY. Thereby aqueous HCl solution would be continuously discharged from the system either as 20 per cent. HCl, as at D, or as 35 per cent. HCl, as at E, while a continuous supply of magnesium chloride would be introduced, as at A. The interrelated operation of the other process steps would not be disturbed by such altered mode of procedure. Hence the process possesses a flexibility permitting it to be adapted to handle either magnesium chloride or a magnesium base, or a combination of the two, as raw material, the choice of one or another material supply being dictated by economic considerations.

The two most readily available and cheapest natural sources of magnesium compound suitable for the manufacture of magnesium are (1) dolomitic or magnesian limestones and (2) natural brines or bitterns containing magnesium chloride usually associated with sodium chloride and calcium chloride. While the separation of sodium chloride from such brines is easily accomplished by evaporation and crystallization according to known methods, the separation of calcium chloride ordinarily involves a more detailed procedure. For purposes of the present process, however, it is particularly advantageous to provide magnesium hydroxide for reacting with hydrochloric acid to form magnesium chloride by treating such a natural or other brine containing magnesium chloride and calcium chloride with slaked calcined dolomitic lime whereby the combined magnesium content of the brine and dolomite is obtained as a precipitate of magnesium hydroxide and the calcium content thereof remains as a solution of calcium chloride. The precipitate is filtered from the solution and preferably washed free from calcium chloride, after which it is employed for reacting with hydrochloric acid as aforesaid. In this way a relatively pure magnesium chloride suitable for electrolysis may be prepared from the ordinary impure natural products available, the modified arrangement of steps thus employed being shown in self-explanatory form in Fig. 2. Similarly, magnesite or magnesia may be employed, instead of dolomitic lime, for reacting with the crude magnesium chloride brine, but the use of such materials will be less desirable on account of their greater cost.

Still another method of making up chlorine or hydrochloric acid losses in the system, instead of adding hydrochloric acid thereto as shown in Figs. 1 and 2, consists in adding an equivalent amount of magnesium chloride at any convenient point, either as solid or solution. When depending upon a natural brine containing calcium and magnesium chlorides as the source of such additional magnesium chloride the operation may be conducted as shown in Fig. 3. The brine is divided into two portions, one being employed to react with slaked calcined dolomite or the like to prepare magnesium hydroxide as already shown, and the other portion being crystallized and separated, first, as the double salt tachydrite, $CaCl_2.2MgCl_2.12H_2O$, from which crystals of $MgCl_2.6H_2O$ may be prepared in known manner as described, for instance, in U. S. Patent 1,627,068 to Smith and Prutton. The purified magnesium chloride crystals may then be introduced into the system in the air-drying stage in amount sufficient to supply the chlorine losses, as indicated in the aforesaid Fig. 3.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. A process of making magnesium which comprises subjecting substantially anhydrous magnesium chloride to electrolysis in a molten bath, separating magnesium and chlorine produced thereby, converting such chlorine to hydrochloric acid and absorbing the latter in an aqueous medium to form a strong solution of such acid, distilling such solution to form a component of strong acid gas and a residual aqueous acid component of approximately constant boiling point concentration and employing said gaseous component for the atmosphere in which to dehydrate additional magnesium chloride for use in said electrolysis step.

2. A process of making magnesium which comprises subjecting substantially anhydrous magnesium chloride to electrolysis in a molten bath, separating magnesium and chlorine produced thereby, converting such chlorine to hydrochloric acid and absorbing the latter in a dilute aqueous hydrochloric acid solution to form a concentrated solution thereof, distilling such concentrated solution to form a component of strong acid gas and a residual aqueous acid component of approximately constant boiling point concentration and employing said gaseous component for the atmosphere in which to dehydrate additional magnesium chloride for use in said electrolysis step.

3. A process of making magnesium which comprises subjecting substantially anhydrous magnesium chloride to electrolysis in a molten bath, separating magnesium and chlorine produced thereby, converting such chlorine to hydrochloric acid and absorbing the latter in a dilute aqueous hydrochloric acid solution to form a concentrated solution thereof, distilling such concentrated solution to form a component of strong acid gas and a residual aqueous acid component of approximately constant boiling point concentration, employing said gaseous component for the atmosphere in which to dehydrate additional magnesium chloride for use in said electrolysis step, and returning at least a portion of said aqueous component to said absorbing step for the dilute acid solution therein.

4. A process of making magnesium which comprises subjecting substantially anhydrous magnesium chloride to electrolysis in a molten bath, separating magnesium and chlorine produced thereby, converting such chlorine to hydrochloric acid and absorbing the latter in a dilute aqueous hydrochloric acid solution to form a concentrated solution thereof, distilling such concentrated solution to form a component of strong acid gas and a residual aqueous acid component of approximately constant boiling point concentration, contacting said gaseous component with partially dehydrated magnesium chloride while drying the same to the anhydrous state, separating absorbed water from said gas by condensing as a concentrated acid solution, returning the same to said distilling step, and recycling the residual acid gas to said drying step.

5. A process of making magnesium which comprises subjecting substantially anhydrous magnesium chloride to electrolysis in a molten bath, separating magnesium and chlorine produced thereby, converting such chlorine to hydrochloric acid and absorbing the latter in a dilute aqueous hydrochloric acid solution to form a concentrated solution thereof, distilling such concentrated solution to form a component of strong acid gas and a residual aqueous acid component of approximately constant boiling point concentration, contacting said gaseous component with partially dehydrated magnesium chloride while drawing the same to the anhydrous state, separating absorbed water from said gas by condensing as a concentrated acid solution, returning the latter to said distilling step, recycling the residual acid gas to said drying step, returning a portion of said aqueous component from the distilling step to said absorbing step for the dilute solution therein, reacting upon a magnesium base with the remaining portion thereof whereby a magnesium chloride solution is formed, evaporating the latter to form solid hydrated magnesium chloride, partially dehydrating the same by drying in air, completing the dehydration thereof by drying further in contact with the gaseous acid as aforesaid and returning the anhydrous magnesium chloride to the electrolysis.

6. A process of making magnesium which comprises subjecting substantially anhydrous magnesium chloride to electrolysis in a molten bath, separating magnesium and chlorine produced thereby, converting such chlorine to hydrochloric acid and absorbing at least a portion of the latter in a dilute aqueous hydrochloric acid solution to form a concentrated solution thereof, and by-passing the remaining portion to the later step wherein it is reacted with a magnesium base, distilling such concentrated solution to form a component of strong acid gas and a residual aqueous acid component of approximately constant boiling point concentration, contacting said gaseous component with partially dehydrated magnesium chloride while drying the same to the anhydrous state, separating absorbed water from said gas by condensing as a concentrated acid solution, returning the latter to said distilling step, recycling the residual acid gas to said drying step, returning a portion of said aqueous component from the distilling step to said absorbing step for the dilute solution therein, reacting upon a magnesium base with the remaining portion thereof whereby a magnesium chloride solution is formed, evaporating the latter to form solid hydrated magnesium chloride, partially dehydrating the same by drying in air, completing the dehydration thereof by drying further in contact with the gaseous acid as aforesaid and returning the anhydrous magnesium chloride to the electrolysis.

7. A process of making magnesium, wherein a magnesian limestone and a brine containing magnesium chloride are employed as the source of such magnesium, which comprises calcining and slaking such magnesian limestone, treating the product with such brine to form a precipitate of magnesium hydroxide and a solution of calcium chloride, separating and washing the precipitate, reacting the same with hydrochloric acid derived from chlorine liberated in the electrolysis of fused magnesium chloride, dehydrating the purified magnesium chloride thereby produced and electrolyzing the same for the production of magnesium and chlorine.

8. A process of making magnesium, wherein a magnesian limestone and a brine containing magnesium chloride are employed as the source of such magnesium, which comprises calcining and slaking such magnesian limestone, treating the product with such brine to form a precipitate of magnesium hydroxide and a solution of calcium chloride, separating and washing the precipitate; electrolyzing magnesium chloride in a molten bath to produce magnesium and chlorine, converting such chlorine to hydrochloric acid, reacting the same with said precipitate, dehydrating the purified magnesium chloride thereby produced and returning the same to the electrolysis.

9. A process of making magnesium, wherein a magnesian limestone and a brine containing magnesium chloride are employed as the source of such magnesium, which comprises calcining and slaking such magnesian limestone, treating the product with such brine to form a precipitate of magnesium hydroxide and a solution of calcium chloride, separating and washing the precipitate; electrolyzing magnesium chloride in a molten bath to produce magnesium and chlorine, converting such chlorine to hydrochloric acid, absorbing the latter in a dilute aqueous hydrochloric acid solution to form a concentrated solution thereof, distilling such concentrated solution to form a component of strong acid gas and a residual aqueous acid component of approximately constant boiling point concentration, contacting said gaseous component with partially dehydrated magnesium chloride while drying the same to the anhydrous state, separating absorbed water from said gas by condensing as a concentrated acid solution, returning the latter to said distilling step, recycling the residual acid gas to said drying step, returning a portion of said aqueous component from the distilling step to said absorbing step for the dilute solution therein, reacting the remaining portion thereof with said precipitate of magnesium hydroxide, partially dehydrating the purified magnesium chloride thereby produced by evaporation and drying in air, completing the dehydration thereof by drying further in contact with the gaseous acid as aforesaid and returning the anhydrous magnesium chloride to the electrolysis.

Signed by us, this 13th day of December, 1929.

EDWIN O. BARSTOW.
SHELDON B. HEATH.